United States Patent [19]
Ko

[11] Patent Number: 5,526,129
[45] Date of Patent: Jun. 11, 1996

[54] TIME-BASE-CORRECTION IN VIDEO RECORDING USING A FREQUENCY-MODULATED CARRIER

[75] Inventor: Jeone-Wan Ko, Suwon, Rep. of Korea

[73] Assignee: SamSung Electronics Co., Ltd., Suwon, Rep. of Korea

[21] Appl. No.: 203,029

[22] Filed: Feb. 28, 1994

Related U.S. Application Data

[63] Continuation-in-part of Ser. No. 755,537, Sep. 6, 1991, abandoned.

[30] Foreign Application Priority Data

Nov. 19, 1990 [KR] Rep. of Korea ............... 90/18736

[51] Int. Cl.⁶ .................................................. H04N 9/79
[52] U.S. Cl. ................. 358/320; 358/323; 358/330; 358/337; 360/36.1; 360/33.1; 348/571; 348/708
[58] Field of Search ......................... 358/310, 320, 358/323, 327, 330, 319, 335, 337; 348/708, 500, 502, 571, 536, 540, 547; 360/33.1, 36.1; H04N 5/76, 9/79

[56] References Cited

U.S. PATENT DOCUMENTS

| | | | |
|---|---|---|---|
| 4,672,470 | 6/1987 | Morimoto et al. | 358/323 |
| 5,062,005 | 10/1991 | Kitaura et al. | 358/320 |
| 5,142,376 | 8/1992 | Ogura | 358/310 |
| 5,218,449 | 6/1993 | Ko et al. | 358/320 |
| 5,231,507 | 7/1993 | Sakata et al. | 358/320 |
| 5,412,481 | 5/1995 | Ko et al. | 359/320 |

*Primary Examiner*—Thai Q. Tran
*Assistant Examiner*—Khoi Truong
*Attorney, Agent, or Firm*—Robert E. Bushnell

[57] ABSTRACT

A circuit for recording and reproducing a TBC reference signal for use in video recording/reproducing systems includes a circuit for adding to a video signal to be recorded a TBC reference signal in which the TBC reference signal has a period adaptively varying corresponding to a synchronizing variation of the video signal; and a circuit for extracting and reproducing a TBC reference signal from a video signal read-out from the recording medium in order to correct time-base errors in the video signal. The circuit corrects time-base errors of the video signal according to a TBC reference signal reproduced along with the video signal from the recording medium during reproduction.

52 Claims, 4 Drawing Sheets

TIME-BASE-CORRECTION IN VIDEO RECORDING USING A FREQUENCY-MODULATED CARRIER

This is a continuation-in-part of U.S. patent application Ser. No. 07/755,587 filed Sep. 6, 1991, now abandoned.

BACKGROUND OF THE INVENTION

The present invention relates, in its various aspects, to time-base correction (TBC) of video signals recorded on frequency-modulated carriers in various video signal recording/reproducing systems, and more particularly to apparatuses for recording and reproducing a reference signal used for correcting timing irregularities of video signals reproduced from such frequency-modulated carriers.

Generally, a video signal includes video information arranged in accordance with a synchronizing signal so as to display accurate images on display devices. This synchronizing signal is affected by noise during recording and reproducing through a recording medium, just as any other information signals are, thereby producing time-base errors in the video information. Time-base errors occur mainly due to mechanical elements included in the recording/reproducing apparatus. Temporal lengthening or shortening of the signal owing to time-base errors causes trembling or "jitter" of reproduced television images which is tiring to a person viewing those images.

Especially when an analog video signal is converted to a digital video signal for digital processing, time-base error can cause a variation in the number of samples per horizontal scan line to occur, even though the number of samples for each horizontal scan line is required to be constant. As a result, video information designated for each pixel location on the television screen may move to the left or to the right by one or more pixels per horizontal scan line, so that the spatial phasing of the signal is not coherent. While the spatial incoherency may be tolerable between adjacent horizontal scan lines, it becomes more severe over several horizontal scan lines, so signal processing between frames becomes impossible due to the changing pixel positions.

A time-base-error corrector (hereinafter referred to as a "TBC") is an apparatus that corrects the timing irregularities ("jitter") of video information due to time-base error of the video signal. The time-base-error corrector is employed to remove the time-base errors created during recording and reproducing and to resynchronize the signal more precisely in video recording and reproducing systems.

Figure 1:
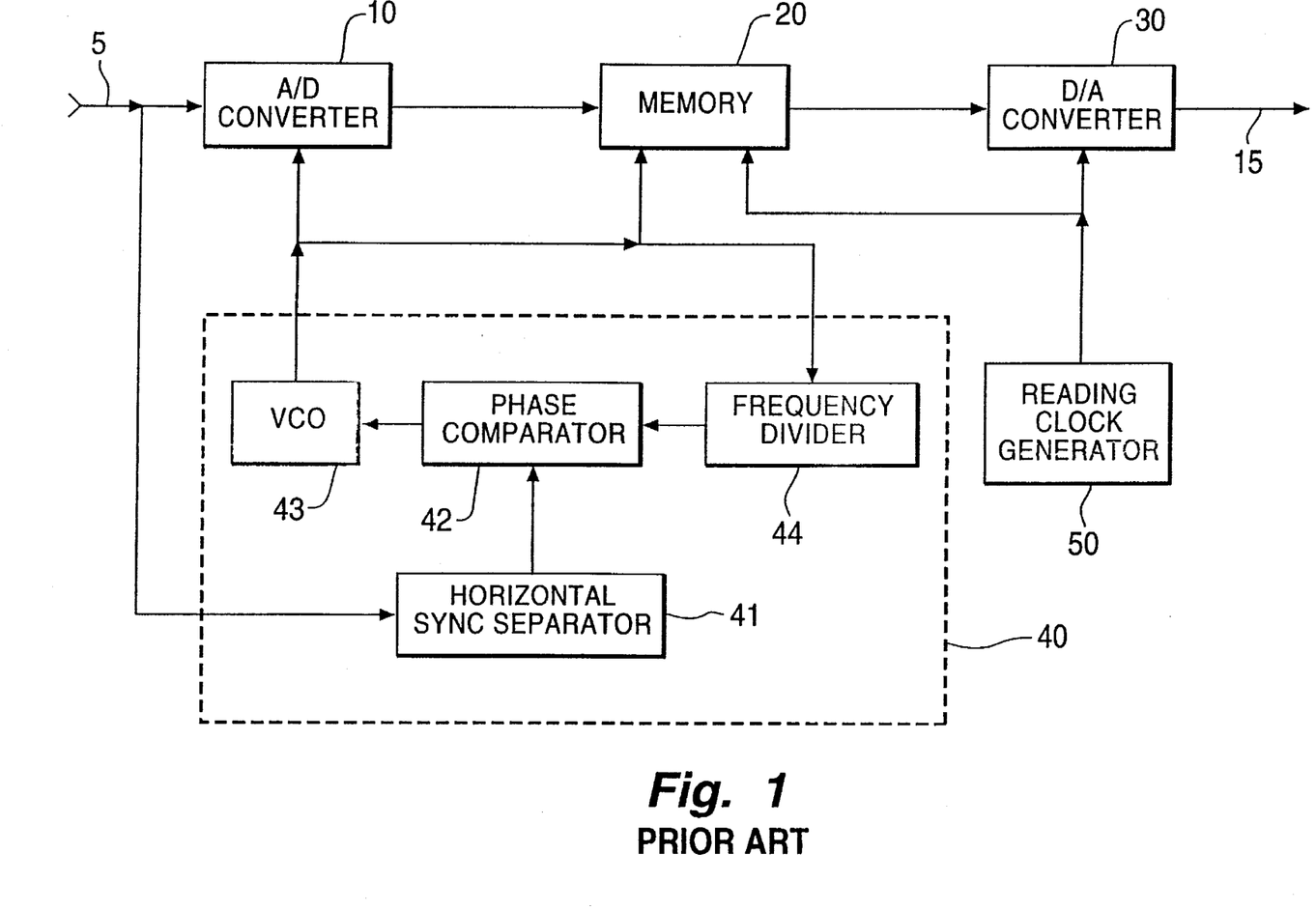
FIG. 1 is a block diagram of a conventional time-base-error corrector.

A conventional TBC used in video recording and reproducing systems will now be described, referring to FIG. 1 of the drawing. In FIG. 1, analog-to-digital converter (A/D converter) 10 samples a video signal entering through input line 5 over respective periods prescribed by a writing clock generator 40, thereby generating a digital video signal. A memory 20 temporarily stores the digital video signal converted in the A/D converter 10 on a first-in/first-out (FIFO) basis. The memory 20 can be constructed using a random-access memory (RAM) with storage capability for several horizontal scan lines, arranged to receive separate write addressing and read addressing. Digital-to-analog converter (D/A converter) 30 converts the digital video signal read-out from the memory 20 to an analog video signal supplied through output line 15. To keep the number of data samples supplied by A/D converter 10 for storage in memory 20 the same for every horizontal scan line, a writing clock generator 40 generates writing clock signals having periods the durations of which are adjustable according to variations of horizontal synchronizing signal periods of the video signal supplied through input line 5. These writing clock signals time the sampling of the video signal on input line 5 by the A/D converter 10. These writing clock signals are also counted for generating write addresses for the memory 20, supposing it to be a RAM arranged for FIFO operation. FIG. 1 does not explicitly show this counter for generating write addresses, which is included in the writing clock generator 40. Reading clock generator 50 generates a reading clock signal having a periodicity that is invariant or substantially invariant. This reading clock signal clocks the reading from the memory 20 during its FIFO operation and times the conversion of the read-out samples to analog video signal by the D/A converter 30. In the writing clock generator 40, a horizontal synchronizing signal separator 41 separates horizontal synchronizing pulses from a video signal supplied through input line 5 for application to a phase comparator 42, there to be compared to the phase of a frequency-divided write clock signal supplied from a frequency divider 44 for generating a control voltage corresponding to the phase difference. Voltage-controlled oscillator 43 (hereinafter referred to as "VCO") generates write clock signals having adjustable frequency and phase depending on the control voltage applied thereto from the phase comparator 42. These write clock signals are supplied to the A/D converter 10, to the FIFO memory 20 and to the frequency divider 44. The frequency divider 44 divides the frequency of the write clock signals in order that the clocks have the same frequency as that of the horizontal synchronizing signal and supplies the clocks to phase comparator 42. This closes an automatic frequency and phase control (AFPC) feedback loop that regulates the write clock signals from the VCO 43 to be a prescribed multiple of the horizontal scan line rate of the video signal on input line 5 by the A/D converter 10, tracking the time-base error in that video signal. The frequency divider 44 commonly includes a counter, which also supplies a count that provides the write clock signals for the memory 20 or that has an offset added to it to provide the write clock signals for the memory 20. This makes the write clock signals track the time base variations of the horizontal synchronizing pulses that the synchronizing signal separator 41 separates from the video signal supplied through input line 5.

Accordingly, the conventional TBC shown in FIG. 1 samples a video signal a prescribed number of times during each horizontal scan line and writes the samples of digitized video signal into the memory 20. Thereafter, such video data stored in the memory 20 is read therefrom in accordance with the reading clock signals having a periodicity that is invariant (or substantially so) and is converted to an analog video signal in D/A converter 30 to correct the time-base error in the video information of the video signals supplied on the output line 15. The reading clock signals are normally read addresses generated by a read address counter cyclically counting the clock signals supplied from a stable oscillator, such as a crystal-controlled type. Time-base-error correction is provided by the memory 20 delaying the digitized video signal in amount controlled by the difference in write and read addresses applied thereto.

In the FIG. 1 TBC, the AFPC feedback loop that regulates the write clock signals from the VCO 43 to be a prescribed multiple of the horizontal scan line rate of the video signal on input line 5 has a time constant which is at least greater than the horizontal synchronizing signal period and is usually of two or three times the horizontal synchronizing signal period. This time constant is established by low-pass filtering in the output circuit of the phase comparator 42. When the frequency transfer characteristic of a recording system is very narrow as compared with the band of an original signal, the rise time and the fall time of the horizontal synchronizing signal are stretched, which makes it difficult to time precisely the ending of each horizontal scan line and the beginning of the next horizontal scan line. Furthermore, because of tracking error in the AFPC loop, which varies somewhat over time because of noise and other factors, the frequency of the write clock signals cannot be changed precisely according to the variation of the horizontal synchronizing signal period. For these reasons, time-base-correction of a video signal can not be carried out with the desired degree of precision by the conventional TBC shown in FIG. 1.

It is observed that the higher the frequency of a single-frequency TBC signal, the greater are the number of radians of phase shift that that signal will exhibit as a result of time-base error. Color bursts are broadcast during horizontal blanking intervals to be used for synchronization of the local color oscillators of television receivers. These horizontal blanking intervals correspond to the times that horizontal retrace occurs in the kinescopes of television receivers, when the video signals applied to the kinescopes are "blanked" by being made blacker than normal black level. Color bursts are not broadcast during certain horizontal blanking intervals that occur in vertical blanking intervals, however. These vertical blanking intervals correspond to the times that vertical retrace occurs in the kinescopes of television receivers, when the video signals applied to the kinescopes are blanked. The color bursts are at color subcarrier frequency (3.58 MHz for the NTSC broadcast standard used in the United States of America). AFPC of a local color oscillator to these bursts of color subcarrier at an odd half-multiple of horizontal line scan rate is substantially more accurate than attempting to AFPC to horizontal synchronizing pulses.

The broadcasting of color burst for synchronization of the local color oscillators of television receivers is perhaps suggestive of video recording using an FM carrier in which a TBC signal is used that comprises intermittent bursts of a single frequency timed to occur during horizontal blanking intervals. Indeed, where the video recording system is sufficiently wideband in nature to permit the recording of a composite video signal, the use of color bursts themselves as TBC signals might be contemplated. The standard duration of color bursts is sufficiently long to allow satisfactory operation of AFPC systems where there is not much time-base error (e.g., in TV receivers receptive of TV broadcast or cablecast transmissions). However, I have found operation of AFPC systems locking to color burst to be unsatisfactory or only marginally satisfactory in video tape recording where there is substantial time-base error. The duration of each color burst is shorter than necessary for satisfactory operation of the AFPC in the time-base corrector. Also, the largest need for AFPC correction occurs during the vertical retrace interval, just after head switching occurs in the helical recording system commonly used in video recording. Color burst is not transmitted during a substantial portion of the vertical retrace interval.

An aspect of my invention is the recording of TBC signals comprising intermittent bursts of a single frequency timed to occur during horizontal blanking intervals, but of longer duration than standard color bursts. Another aspect of my invention is the recording of TBC signals comprising sustained transmission of a single frequency, respective ones of which transmissions are timed to occur during corresponding ones of consecutive vertical blanking intervals. These longer duration TBC signals permit more satisfactory operation of the AFPC in the time-base corrector. Where the video recording system has sufficient bandwidth to permit the recording of composite video signal, the single frequency used in the TBC signal can be color subcarrier frequency, but better AFPC operation can be obtained using a TBC signal of still higher frequency.

Many, if not most, video recording systems using an FM carrier have insufficient bandwidth to permit the recording of composite video signal. Commonly, the composite video signal is separated into luminance-signal and chrominance-signal components, the luminance signal is used to modulate the frequency of a luma carrier to generate an upper band of the signal recorded on the magnetic recording medium, and the chrominance signal is down-converted in frequency to generate a color-under signal that is used as a lower band of the signal recorded on the magnetic recording medium. In such video recording systems the bandwidth of the luminance signal is generally restricted to only 2.5 to 3 MHz. I find that operation of the AFPC for the oscillator used to generate write signals for the TBC memory is only marginally satisfactory for a TBC signal comprising intermittent bursts of a frequency lower than color subcarrier, which bursts are timed to occur during horizontal blanking intervals.

I find that a higher-frequency TBC signal (of, say, 5 MHz) can be accommodated, even though the signal modulating the frequency of the luma carrier is restricted to only 2.5 to 3 MHz. Rather than including the TBC signal in the signal modulating the frequency of the luma carrier, during retrace or blanking intervals it is additively mixed (i.e., frequency-division-multiplexed) with the FM luma carrier and the AM color-under signal. After reproducing the frequency-division-multiplex signal recorded on the recording medium, the AM color-under signal is selected by a lowpass filter that does not respond to the FM luma carrier and the TBC signal, and the FM luma carrier and the TBC signal are selected by a highpass filter that does not respond to the AM color-under signal. The luminance signal is recovered by an FM detector following the highpass filter. Supposing that the TBC signal is transmitted only during retrace intervals, it can be blanked out of the luminance signal recovered by the FM detector. However, if the TBC signal is of relatively small amplitude compared to the FM luma carrier with which it is additively mixed, the capture phenomenon associated with the FM detection process will suppress the TBC signal in the FM detector response. The TBC signal is suppressed in the FM detector response even during blanking intervals, so it does not interfere with synchronizing signal separation from the FM detector response. The TBC signal is separated from the highpass filter response by appropriate gating, by frequency-selective filtering, or by a combination of appropriate gating and frequency-selective filtering.

While the TBC signal could be at a frequency above the frequency band which the sidebands of the frequency-modulated luma carrier occupy, this would require more expensive heads with narrower gaps and better recording tape. So, a better commercial solution is to place the TBC signal within the same frequency band as the sidebands of the frequency-modulated luma carrier. Making the TBC signal the same frequency as color subcarrier (3.58 MHz for the NTSC broadcast standard used in the United States of America) in VHS-type video recording complicates the frequency-selective filtering for separating the TBC signal from the 3.4–3.68 MHz principal sideband frequencies of the luma carrier generated responsive to sync pulses.

Accordingly, I prefer to use a TBC signal that is at a frequency above the principal sideband frequency of the luma carrier when modulated past the white end of the gray scale, but is still within the extended upper sideband response that is recorded on the video recording tape. I find a TBC signal of around 5 MHz to be desirable. If one desires, with such a TBC signal above normal video frequencies, trap filtering can be used to remove the TBC signal from the luminance signal reproduced from the video tape, rather than removing the TBC signal just by selectively blanking the luminance signal.

SUMMARY OF THE INVENTION

A first aspect of my invention, pointed out above, is the recording of TBC signals comprising intermittent bursts of a single frequency timed to occur during horizontal blanking intervals, but of longer duration than standard color bursts. A second aspect of my invention, also pointed out above, is the recording of TBC signals comprising sustained transmissions of a single frequency, respective ones of which transmissions are timed to occur during corresponding ones of consecutive vertical blanking intervals. A third aspect of my invention, also pointed out above, is the recording of TBC signals that are of higher frequency than the frequencies of a video signal, additively mixed with a carrier the frequency of which is modulated in accordance with that video signal. These first, second and third aspects of my invention may be used singly or in combination with each other.

In certain preferred embodiments of the recording aspects of my invention, during recording the FM carrier is replaced by the single-frequency TBC signal additively mixed with a frequency-shift-keying signal comprising alternatively selected carriers respectively representing noise-free sync pulse pedestal and tip excursion levels. Preferably, this single-frequency TBC signal is of a smaller amplitude than either of the alternatively selected carriers so that the TBC signal can be suppressed in the response of an FM detector, relying on the capture phenomenon.

In an aspect of my invention having to do with separating a TBC signal from a frequency-division-multiplexed signal reproduced from a recording medium, the AM color-under signal is selected by a lowpass filter that does not respond to the FM luma carrier and the TBC signal, and the FM luma carrier and the TBC signal are selected by a highpass filter that does not respond to the AM color-under signal. The luminance signal is recovered by an FM detector following the highpass filter, the FM detector suppressing the TBC signal which is not part of the signal modulating the frequency of the FM carrier. The TBC signal is separated from the highpass filter response by appropriate gating, by frequency-selective filtering, or by a combination of appropriate gating and frequency-selective filtering.

BRIEF DESCRIPTION OF THE DRAWINGS

These and other advantages of the various aspects of my invention will be more apparent by describing preferred embodiments thereof with reference to the attached drawings, in which.

DETAILED DESCRIPTION OF THE INVENTION

Figure 2:
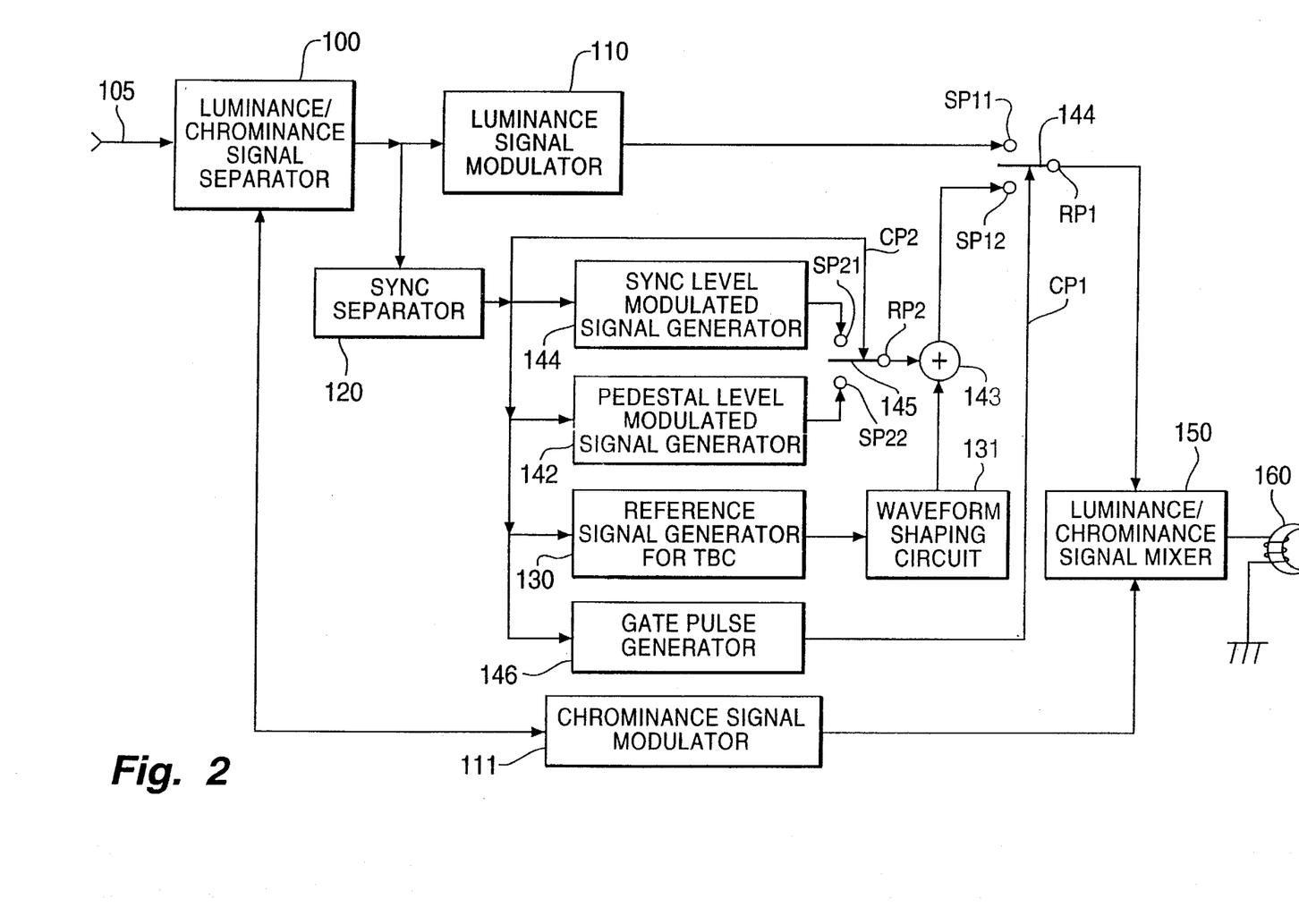
FIG. 2 is a block diagram of one example of a circuit for recording a reference signal for correcting time-base error, embodying certain aspects of my invention.

FIG. 2 shows a circuit for recording a reference signal for correcting a time-base error, which circuit embodies certain aspects of my invention. In the FIG. 2 recording circuitry an input line 105 applies composite video signal from an external video signal source (not shown) to the input terminal of luminance/chrominance signal separator 100. A first output terminal of the luminance/chrominance signal separator 100 is connected to the input terminals of a synchronizing signal separator 120 and a luminance signal modulator 110 for supplying them with a separated luminance signal that includes horizontal and vertical synchronizing information. The luminance signal modulator 110 is assumed to be of a conventional type in which the frequency of a luma carrier is modulated in accordance with the separated luminance signal and the resulting frequency-modulated (FM) luma carrier is filtered to fit within a first frequency band, which first frequency band is located far enough above zero frequency as not to overlap a second frequency band located between zero frequency and the first frequency band. A second output terminal of the luminance/chrominance signal separator 100 is connected to an input terminal of a chrominance signal modulator 111 for supplying it with a separated chrominance signal. The chrominance signal modulator 111 is assumed to be of a conventional type in which the separated chrominance signal is down-converted in frequency to generate a color-under signal falling within the second frequency band located between zero frequency and the first frequency band containing FM luma carrier. An output terminal of the luminance signal modulator 110 is connected to a first selection point SP11 of a first time-division multiplexer 144. The reference connection point RP1 of the first time-division multiplexer 144 is connected for supplying signals in the first frequency band to a first input terminal of a luminance/chrominance signal frequency mixer 150. The output terminal of chrominance signal modulator 111 is connected for supplying color-under signals in the second frequency band to a second input terminal of luminance/chrominance signal mixer 150. Mixer 150 is an additive mixer used as a frequency-division multiplexer. An output terminal of luminance/chrominance signal mixer 150 is connected to a magnetic head 160. The luminance/chrominance signal mixer 150, which may simply consist of an analog adder followed by a record amplifier, supplies the magnetic head 160 a frequency-multiplexed signal responding to the signals the mixer 150 receives in both the first and second frequency bands.

An output terminal of synchronizing signal separator 120 is connected to input terminals of a TBC reference signal generator 130, a synchronizing level modulated signal generator 141, a pedestal level modulated signal generator 142 and a gate pulse generator 146. An output terminal of TBC reference signal generator 130 is connected to an input terminal of waveform shaping circuit 131. An output terminal of the waveform shaping circuit 131 is connected to a first input terminal of reference signal mixer 143. A first output terminal of synchronizing level modulated signal generator 141 is connected to a first selection point SP21 of a second time-division multiplexer 145. A second output terminal of synchronizing level modulated signal generator 141 is connected to control port CP2 of the second time-division multiplexer 145. An output terminal of pedestal level modulated signal generator 142 is connected to a second selection point SP22 of the second time-division multiplexer 145. An output terminal of the second time-division multiplexer 145 is connected to a second input terminal of reference signal mixer 143. The output terminal of the reference signal mixer 143 is connected to a second selection point SP12 of the first time-division multiplexer 144. An output terminal of gate pulse generator 146 is connected to control point CP1 of the first time-division multiplexer 144.

Figure 3A:
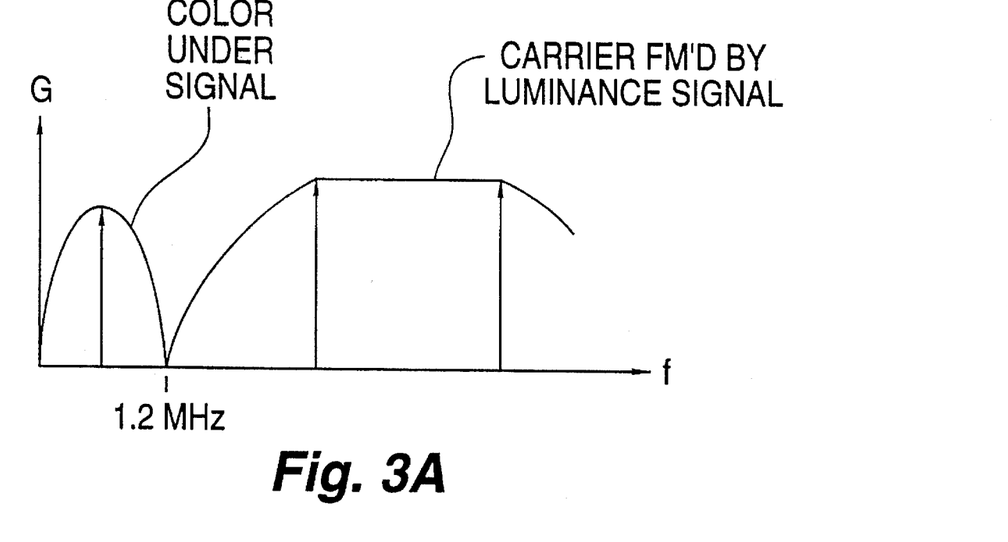
FIGS. 3A and 3B illustrate the frequency characteristics of a video signal processed by the circuit shown in FIG. 2.
Figure 3B:
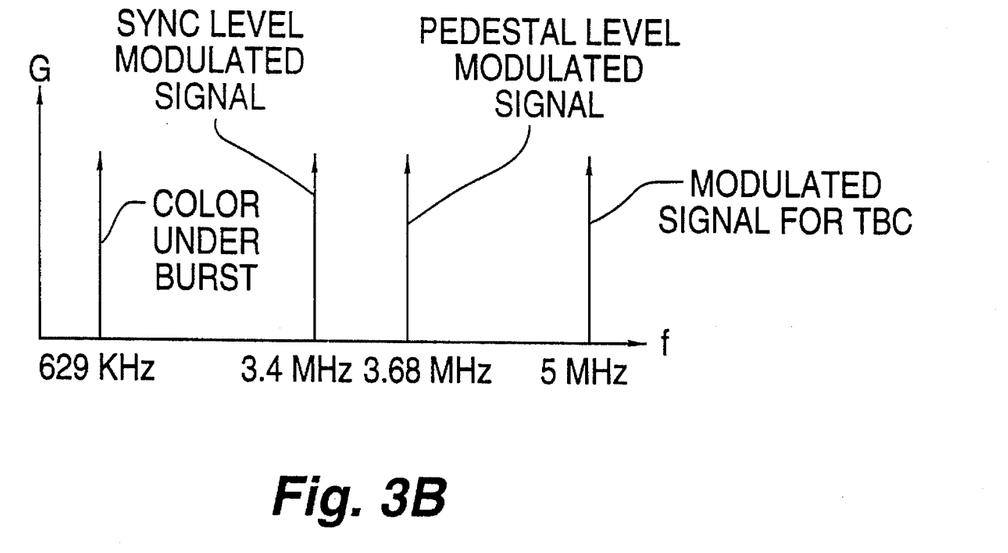

FIGS. 3A and 3B show frequency characteristics of the output signal from the luminance/chrominance mixer 150 in the circuit shown in FIG. 2, wherein FIG. 3A shows the frequency characteristics of the video signal in a horizontal trace interval and FIG. 3B shows the frequency characteristics of the video signal during color burst in a horizontal retrace interval. The frequency characteristics of the video signal in a vertical retrace interval are similar to those shown in FIG. 3B except that color burst as translated to 629 kHz generally does not appear.

In FIG. 2, luminance/chrominance signal separator 100 separates video signals input through the input line 105 into a luminance signal and a chrominance signal. The luminance signal separated by the separator 100 is applied from its first output terminal to the input terminals of luminance signal modulator 110 and synchronizing signal separator 120. The chrominance signal separated by the separator 100 is applied from its second output terminal to the input terminal of chrominance signal modulator 111. In luminance signal modulator 110, the luma carrier signal is frequency-modulated in accordance with the separated luminance signal. As shown in FIG. 3A, this generates an FM signal that lies in the first frequency band extending from about 1.2 to 7 MHz. This FM signal is supplied to the first selection point SP11 of the first time-division multiplexer 144. In chrominance signal modulator 111 the chrominance signal is down-converted in frequency to form a color-under signal distributed within the second frequency band extending from 0 to 1.2 MHz, as shown in FIG. 3A. During horizontal trace intervals this color-under signal comprises amplitude-modulation (AM) sidebands of a suppressed 629 kHz color-under carrier in various phasings, and during horizontal retrace intervals this color-under signal comprises bursts of the suppressed 629 kHz color-under carrier in various phasings. This color-under signal is supplied to the second input terminal of luminance/chrominance signal mixer 150.

Synchronizing signal separator 120 separates both horizontal and vertical synchronizing signals from the luminance signal, supplying those separated synchronizing signals to the input terminals of the synchronizing level modulated signal generator 141, the pedestal level modulated signal generator 142, the TBC reference signal generator 130 and the gate pulse generator 146. The synchronizing pulses separated from the luminance signal by the separator 120 are applied as a control signal to the second time-division multiplexer 145. Throughout the duration of each synchronizing pulse the multiplexer 145 is conditioned to select to the reference point RP2 as its output signal an unmodulated carrier signal of a first prescribed frequency that is the same frequency as would be associated with modulation of the luma carrier by noise-free sync tip level in the luminance signal modulator 110, that is generated within the synchronizing level modulated signal generator 141, and that is applied to the first selection point SP21 of the multiplexer 145. Throughout each interval between consecutive synchronizing pulses the multiplexer 145 is conditioned to select to the reference point RP2 as its output signal an unmodulated carrier signal of a second prescribed frequency that is the same frequency as would be associated with modulation of the luma carrier by noise-free sync pedestal level in the luminance signal modulator 110, that is generated within the pedestal level modulated signal generator 142, and that is applied to the second selection point SP22 of the multiplexer 145. The reference point RP2 of the second time-division multiplexer 145 supplies the second input terminal of the reference signal mixer 143 noise-free frequency-shift-keying signals that are used to replace the output of the luminance modulator 110 during blanking intervals. The synchronizing level modulated signal generator 141 and the pedestal level modulated signal generator 142 can each include a respective oscillator, the oscillators each being arranged to be keyed on and off to the reference point RP2, as shown in FIG. 2. Alternatively, one of the several equivalent circuits known for generating frequency-shift-keying signals can be used instead. The two frequencies are referred to in this specification as "synchronizing level modulated signal" and "pedestal level modulated signal" since they correspond to what the principal sideband frequencies of the luma carrier would be if its frequency were modulated by synchronizing level and by synch pedestal level, respectively of a luminance signal containing synchronizing pulses. The amplitude of the pedestal level modulated signal supplied from the generator 142 to the second time-division multiplexer 145 is the same at the reference point RP2 as the amplitude of the synchronizing level modulated signal supplied from the generator 141 to the second time-division multiplexer 145.

Reference signal generator 130 comprises a voltage-controlled oscillator 43, a phase comparator 42 and a frequency divider 44 of a write clock generator 40 as shown in FIG. 1. A highpass filter further separates the horizontal synchronizing signals from the sync separator 120 output signal. The reference signal generator 130 detects any departure of the divided VCO frequency from the pulse rate of the further separated horizontal synchronizing signals, and generates a TBC reference signal in the form of a stream of clock pulses having a period determined by the period between detected horizontal synchronizing signals. These clock pulses are generated at a rate that is a many-times multiple of the rate of the detected horizontal synchronizing signal or of that rate as divided by a small integer, two or more. Wave-form shaping circuit 131 filters the TBC reference signal in clock pulse form to generate a sinusoidal TBC reference signal, which fits within a narrow third frequency band and is applied to the second input terminal of the reference signal mixer 143. As noted previously, I prefer this narrow third frequency band to be located within the first frequency band that contains the sidebands of the frequency-modulated luma carrier, but at a location well away from the 3.4–3.68 MHz principal sideband frequencies of the luma carrier generated responsive to sync pulses; such procedure facilitates separating the sinusoidal TBC reference signal from those FM sidebands by frequency-selective filtering in the reproducing apparatus. The reference signal mixer 143 mixes the sinusoidal TBC reference signal supplied from the waveform shaping circuit 131 with the modulated signals supplied from the reference connection point RP2 of the second time-division multiplexer 145 and supplies the mixed signals to the second selection connection point SP12 of the first time-division multiplexer 44. Making the amplitude of the sinusoidal TBC reference signal component of the mixer 143 output signal smaller than the amplitude of its synchronizing level modulated signal component and its pedestal level modulated signal component is preferred, since this makes an FM detector in the reproducing apparatus relatively insensitive to the presence of the TBC reference signal.

FIG. 3B shows the first prescribed frequency being a 3.4 MHz frequency as would be associated with modulation of the luma carrier by noise-free sync tip level in the luminance signal modulator 110, the second prescribed frequency being a 3.68 MHz frequency as would be associated with modulation of the luma carrier by noise-free sync pedestal level in the luminance signal modulator 110, and the TBC reference signal being around 5 MHz—say, 320 times horizontal scan rate. A frequency-shift-keying signal, which frequency-shift-keying signal comprises the noise-free pedestal level modulated signal and noise-free synchronizing level modulated signal, is additively mixed with the TBC reference signal to supply a signal for the first time-division multiplexer 144 to time-division multiplex with the FM luma carrier. This avoids FM sidebands arising from the frequency of the luma carrier output video signal being modulated by noise occurring during the blanking interval and synchronizing period of the modulated luminance signal in which the TBC reference signal is to be inserted. Accordingly, the TBC signal reference signal is kept free of contaminating noise that otherwise might occur closeby in frequency.

In order to determine the portions of the luminance signals into which the TBC reference signal is to be inserted, gate pulse generator 146 detects a synchronizing pulse or blanking pulse from the horizontal synchronizing signals, delays the detected synchronizing pulse or blanking pulse by a certain period (for instance, 55 μs shorter than the period of the horizontal synchronizing signal), generates in response to the delayed pulse a gate pulse having a width sufficient to cover the blanking interval of the horizontal synchronizing signal and supplies the gate pulse to the control port CP1 of the first time-division multiplexer 144. The gate pulse generator 146 also generates a gate pulse having a width sufficient to cover the blanking interval of the vertical synchronizing signal and also supplies that gate pulse to the control port CP1 of the first time-division multiplexer 144. This latter gate pulse can, as known by those skilled in the art, be generated by decoding the count of a scan line counter counting horizontal synchronizing pulses separated by highpass filtering of the sync separator 120 output signal and reset by vertical synchronizing pulses separated by lowpass filtering of the sync separator 120 output signal. Those values of the scan line count corresponding to vertical retrace intervals in odd fields and in even fields are decoded to generate gating pulses having widths sufficient to cover those vertical blanking intervals.

The first time-division multiplexer 144 selects the output of the reference signal mixer 143 supplied to the second selection point SP12 while the gate pulse is applied from the gate pulse generator 146 to the control port CP1 and supplies the result to the first input terminal of the luminance/chrominance signal mixer 150. On the other hand, during the time that the gate pulse is not applied to the control port CP1, the first time-division multiplexer 144 selects the output of the luminance signal modulator 110 supplied to the first selection point SP11 and supplies the selected output to the luminance/chrominance signal mixer 150.

Luminance/chrominance signal mixer 150 additively mixes the modulated luminance signal, in which the TBC reference signal is inserted, supplied from the reference connection point RP1 of the first time-division multiplexer 144 with the color-under signal supplied from the chrominance signal modulator 111 and records the mixed signals on a recording medium through magnetic head 160. The video signal mixed in the luminance/chrominance mixer 150 has frequency characteristics such as shown in FIG. 3A during a horizontal scanning period, and has frequency characteristics such as shown in FIG. 3B during a blanking interval.

When the synchronizing signals of the video signal are changed by the effect of a time-base error, the TBC reference signal recorded with the video signal is changed by the same amount of delay as the synchronizing signals are. Accordingly, the video information of the video signal can be time-base-corrected by the changed TBC reference signal during reproduction, thereby performing the correction precisely.

Figure 4:
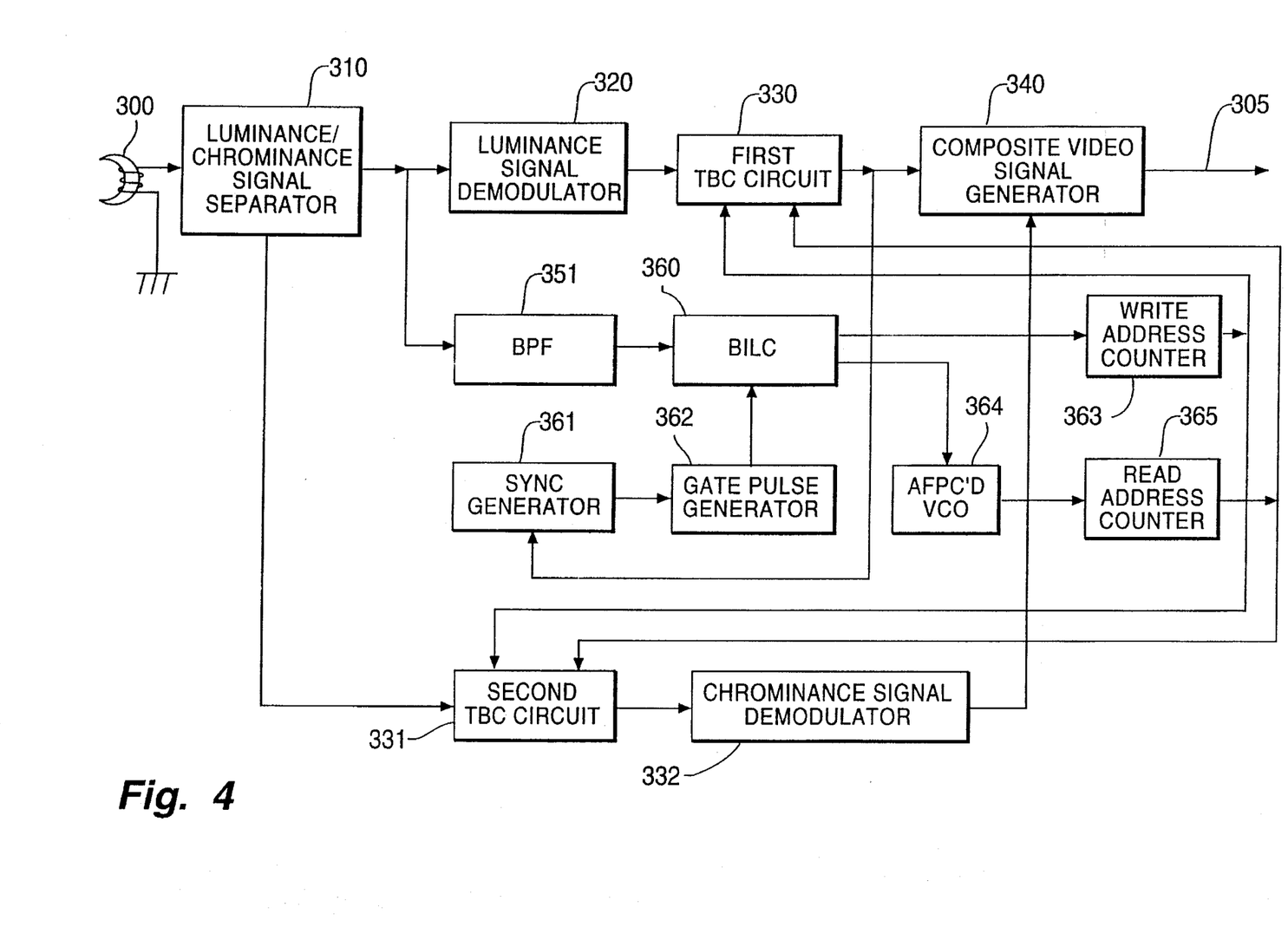
FIG. 4 is a block circuit diagram of an embodiment of the circuit for reproducing a reference signal for correcting time-base error according to other aspects of my invention.

FIG. 4 is a block diagram of a circuit for reproducing a TBC reference signal according to aspects of my invention. In FIG. 4, magnetic head 300 is connected to the input terminal of luminance/chrominance signal separator 310. A first output terminal of the luminance/chrominance signal separator 310 is connected to input terminals of luminance signal demodulator 320 and bandpass filter 351. An output terminal of the luminance signal demodulator 320 is connected to an input terminal of a first TBC circuit 330. An output terminal of the first TBC circuit 330 is connected to an input terminal of synchronizing signal separator 361 and to a first input terminal of composite video signal generator 340. A second output terminal of the separator 310 is connected to an input terminal of the second TBC circuit 331. An output terminal of the second TBC circuit 331 is connected to an input terminal of chrominance signal demodulator 332. An output terminal of chrominance signal demodulator 332 is connected to a second input terminal of composite video signal generator 340. An output line terminal 305 of the composite video signal generator 340 is connected to an external display device or other video recording systems (not shown).

An output terminal of the bandpass filter 351 is connected to an input terminal of burst injection locking circuit 360 (hereinafter referred to as BILC). An output terminal of synchronizing signal separator 361 is connected to an input terminal of gate pulse generator 362. The gate pulse generator 362 is connected to a control terminal of BILC 360. A first output terminal of the BILC 360 is connected to the count input terminal of a write address counter 363, the count output terminal of which connects to the write address terminals of the first TBC circuit 330 and a second TBC circuit 331. A second output terminal of the BILC 360 is connected to the control terminal of an automatic-frequency-and-phase-controlled oscillator 364. An output terminal of the AFPC'd oscillator 364 is connected to the count input terminal of a read address counter 365, the count output terminal of which connect to the read address terminals of the first TBC circuit 330 and of the second TBC circuit 331. The first and second TBC circuits 330 and 331 each include respective random access memory with enough storage capability for at least a few horizontal scan lines of information.

In operation, magnetic head 300 reads out video information from a recording medium and supplies the information to luminance/chrominance signal separator 310. The luminance/chrominance signal separator 310 includes means, such as a highpass filter, responding to the video information supplied from the magnetic head 300 for supplying from the first output terminal of the separator 310 a luminance signal mixed with a TBC reference signal. The luminance/chrominance signal separator 310 also includes means, such as a lowpass filter, responding to the video information supplied from the magnetic head 300 to supply a chrominance signal from the second output terminal of the separator 310.

Bandpass filter 351 detects the TBC reference signal by bandpass filtering the luminance signal mixed with the TBC reference signal to select the narrow third frequency band, which does not include the synchronizing level modulated signal component or the pedestal level modulated signal component of the signal supplied from the first output terminal of the luminance/chrominance signal separator 310. In preferred embodiments of reproducing apparatus constructed in accordance with aspects of my invention, the third frequency band is higher in frequency than the first frequency band in which the frequency-modulated luma carrier and its sidebands repose. The bandpass filter 351 can be connected somewhat differently than shown, to receive input signal in parallel with the luminance/chrominance signal separator 310, without affecting operation much.

Luminance signal demodulator 320 frequency-demodulates the luminance signal mixed with the TBC reference signal and supplies the demodulated luminance signal to the first TBC circuit 330. As the result of steps taken during recording of the TBC signal, as described above with reference to the FIG. 2 recording apparatus, the amplitude of the TBC reference signal component in the input signal to the luminance signal demodulator 320 is relatively small compared to the amplitude of its synchronizing level modulated signal component and its pedestal level modulated signal component. The larger-amplitude synchronizing level modulated signal component or pedestal level modulated signal component of the input signal to the luminance signal demodulator 320 determines the zero crossings of that input signal, rather than its smaller-amplitude sinusoidal TBC reference signal component. So the capture phenomenon, associated with amplitude-limiting of this input signal incidental to detecting the variation of the frequency of those zero crossings by an FM detector included in the luminance signal demodulator 320, suppresses the TBC reference signal in the FM detector output signal.

The first TBC circuit 330 corrects the time-base error of the demodulated luminance signal input from the luminance signal demodulator 320 and generates the corrected luminance signal. Synchronizing signal separator 361 separates horizontal and vertical synchronizing signals from the corrected luminance signal and supplies them to the gate pulse generator 362. The gate pulse generator 362 has substantially the same construction as the gate pulse generator 146 used for recording; indeed, in a single machine the same circuitry may be used both during video signal recording and during video signal reproducing. The gate pulse generator 362 supplies gate pulses to the BILC 360 at the times the TBC reference signal is included in the recorded signal being reproduced—i.e., during each horizontal blanking interval and throughout each vertical blanking interval.

Responsive to a gate pulse being applied to the BILC 360 from the gate pulse generator 262, the TBC reference signal detected by the bandpass filter 351 is applied as an injection locking signal to an injection-lock oscillator included in the BILC 360. The injection locking signal almost instantaneously adjusts the frequency of the injection-lock oscillator to correspond the frequency of the input TBC reference signal. The BILC 360 further includes circuitry for responding to the oscillations of the injection-lock oscillator to generate pulses for counting by the write address counter 363. These pulses are cyclically counted by the write address counter 363 to generate write addresses applied to the write address terminals of the first and second TBC circuits 330 and 331.

An output signal is supplied from the BILC 360 to the control terminal of the AFPC'd oscillator 364, which includes a voltage-controlled oscillator (VCO), a discriminator for comparing the frequency and phase of the VCO oscillations with the output signal supplied from the BILC 360 signal thereby to generate an error signal, and a lowpass filter for the error signal. The output signal supplied from the BILC 360 to the discriminator can be in the form of sinusoidal oscillations from the injection-locked oscillator or in the form of pulses such as supplied for counting by the write address counter 363. The VCO in the AFPC'd oscillator 364 includes high-Q resonant circuitry, typically being a crystal oscillator, so the short-term frequency stability of its oscillations is very good. The lowpass filter for the AFPC error signal has a time constant that is at least several times as long as horizontal scan rate, so adjustment of the average frequency of the VCO to correspond to the average frequency of the input TBC reference signal takes place slowly over a very long time-averaging interval. Accordingly, the oscillations of the VCO in the AFPC'd oscillator 364 are free of "jitter" in frequency or phase that appears in the output signals of the BILC 360. The AFPC'd oscillator 364 further includes circuitry for responding to the oscillations of the VCO to generate pulses for counting by the read address counter 365. These pulses are cyclically counted by the read address counter 365 to generate read addresses applied to the read address terminals of the first and second TBC circuits 330 and 331.

Using the AFPC'd oscillator 364, rather than a fixed frequency oscillator, for generating the pulses counted by the read address counter 365 is advantageous in that the number of read addresses generated over time is always the same as the number of write addresses generated over time by the write address counter 363 counting the pulses generated by the BILC 360. The automatic frequency and phase control of oscillator 364 regulates the frequency of its oscillations so that over extended periods of time they have the same number of cycles as do the oscillations of the injection-lock oscillator included in the BILC 360. There is no possibility of slippage of cycle count by a cycle over extended periods of time, as can occur when a fixed frequency oscillator is used for generating the pulses counted by the read address counter 365.

The chrominance signal supplied in color-under form from the second output terminal of the luminance/chrominance signal separator 310 is applied to the input terminal of the second TBC circuit 331. Time-base-corrected chrominance signal in color-under form is supplied from the output terminal of the second TBC circuit 331 to the input terminal of the signal demodulator 332. Chrominance signal demodulator 332 is assumed to be of a type in which a color-under signal falling within the second frequency band located between zero frequency and the first frequency band containing FM luma carrier is up-converted in frequency to regenerate the separated chrominance signal. The up-conversion of the time-base-corrected chrominance signal in color-under form supplied from the output terminal of the second TBC circuit 331 generates time-base-corrected chrominance signal suitable for inclusion in a composite video signal. Composite video signal generator 340 mixes the corrected luminance signal and the corrected chrominance signal to generate a composite video signal and supplies it to a display apparatus or other image recording systems through the output line 305. Alternatively, the time-base-corrected chrominance signal can be demodulated to supply color-difference signals and luminance signals to a display apparatus, such procedure being followed in "combos" which combine television receiving/display apparatus and television recording/reproducing apparatus in a single cabinet.

Up-conversion of chrominance signal in color-under form by the chrominance signal demodulator 332 is conventionally carried out by heterodyning the color-under signal with a "nervous" carrier signal tracking fluctuations in horizontal synchronization pulse rate during reproducing. This procedure has time-base-correcting capability of its own, as is well known, but it is difficult to track the resulting time-base-correction of the chrominance signal precisely with the time-base-correction of the luminance signal by the first TBC circuit 330. The second TBC circuit 331 precisely tracks time-base-correction of the chrominance signal to the time-base-correction of the luminance signal by the first TBC circuit 330. The subsequent up-conversion of the time-base-corrected chrominance signal in color-under form by the chrominance signal demodulator 332 has at most an auxiliary role in providing time-base correction for the chrominance signal. The chrominance signal demodulator 332 can be modified so as to heterodyning the color-under signal with a stable carrier signal, simplifying its circuitry somewhat, if desired.

One skilled in the art of video signal recording/reproducing systems and acquainted with the foregoing disclosure will be enabled to design a number of embodiments of the invention in its various aspects, other than the preferred embodiments described in this specification, and this should be borne in mind when construing the scope of the claims which follow this specification. In a video signal recording/reproducing system embodying aspects of my invention in non-preferred way, the sync separator 120 used during recording and the sync separator 361 used during reproducing are horizontal sync separators separating just horizontal synchronizing pulses and not vertical synchronizing pulses. The gate pulse generators then generate gate pulses only during horizontal blanking intervals. In another video signal recording/reproducing system embodying aspects of my invention in non-preferred way, the TBC signal is superposed on the frequency-modulated luma carrier during blanking intervals, without replacing the frequency-modulated luma carrier during blanking intervals with noise-free frequency-shift-keying signal. In the reproducing apparatus, variants are possible wherein the BILC 360 does not supply input signal continually to the AFPC'd oscillator 364. Input signal can, for example, be withheld from the AFPC'd oscillator 364 during times when switching between heads, when "jitter" in the frequency and phase of the BILC 360 output signal is likely to be greater than at other times. Variants are also possible wherein the time constant of the filtering of the AFPC error signal is altered when "jitter" in the frequency and phase of the BILC 360 output signal is likely to be greater.

What is claimed is:

1. Time-base-correction apparatus for a video recording/reproducing system including a recorder for recording a video signal on a recording medium and a reproducer for reproducing the video signal recorded on the recording medium and correcting time-base error, said time-base-correction apparatus comprising:

means included in said recorder for generating said time-base-correction reference signal during each horizontal blanking interval of said video signal as originally supplied for recording;

means included in said recorder for recording on the recording medium said video signal as originally supplied for recording at least at times other than the horizontal blanking intervals and vertical blanking intervals thereof;

means included in said recorder for selectively recording on the recording medium said time-base-correction reference signal during said horizontal blanking intervals, but not during horizontal trace intervals outside said vertical blanking intervals;

means included in said reproducer for reproducing said selectively recorded time-base-correction reference signal and said recorded video signal from said recording medium;

means for separating said selectively recorded time-base-correction reference signal from said recorded video signal reproduced from said recording medium; and means for correcting time-base errors of said video signal reproduced by said reproducer in response to said time-base-correction reference signal separated therefrom.

2. Time-base-correction apparatus as set forth in claim 1 further comprising:

means included in said recorder for selectively recording on the recording medium said time-base-correction reference signal throughout said vertical blanking intervals.

3. Time-base-correction apparatus as set forth in claim 1, further comprising:

means for substituting during horizontal and vertical blanking intervals in said video signal as actually recorded, a frequency-shift-keying signal comprising first and second frequencies respectively descriptive of tip and pedestal levels of synchronizing pulses occurring during said blanking intervals, in place of said video signal as originally supplied for recording.

4. Time-base-correction apparatus as set forth in claim 3 wherein said means for generating said time-base-correction reference signal generates said time-base-correction reference signal with a frequency above the first and second frequencies of said frequency-shift-keying signal.

5. Time-base-correction apparatus as set forth in claim 3 wherein said means for generating said time-base-correction reference signal generates said time-base-correction reference signal with a frequency above all frequencies in said video signal as originally supplied for recording.

6. Time-base-correction apparatus as set forth in claim 1, further comprising:

means for substituting during horizontal blanking intervals in said video signal as actually recorded, a frequency-shift-keying signal comprising first and second frequencies respectively descriptive of tip and pedestal levels of synchronizing pulses occurring during said blanking intervals, in place of said video signal as originally supplied for recording.

7. Time-base-correction apparatus as set forth in claim 6 wherein said means for generating said time-base-correction reference signal generates said time-base-correction reference signal with a frequency above the first and second frequencies of said frequency-shift-keying signal.

8. Time-base-correction apparatus as set forth in claim 6 wherein said means for generating said time-base-correction reference signal generates said time-base-correction reference signal with a frequency above all frequencies in said video signal as originally supplied for recording.

9. Apparatus for recording, together with a time-base-correction/reference signal, a video signal having horizontal and vertical blanking intervals therewithin in which horizontal and vertical synchronizing signals are respectively included; said apparatus comprising:

means for actually recording a signal on the recording medium;

means for including in said signal actually recorded on the recording medium, at least at times other than horizontal and vertical blanking intervals of said video signal, signals descriptive of said video signal as originally supplied for recording;

means for generating said time-base-correction reference signal at least throughout each of said horizontal blanking intervals; and     means for selectively including said time-base-correction reference signal in said signal actually recorded on the recording medium, said time-base-correction reference signal being included in said signal actually recorded on the recording medium during said horizontal blanking intervals, but not during horizontal trace intervals of said video signal outside said vertical blanking intervals.

10. Apparatus for recording as set forth in claim 9, wherein said means included in said recorder for generating said time-base-correction reference signal at least throughout each of said horizontal blanking intervals includes     means for generating said time-base-correction reference signal throughout each of said vertical blanking intervals; and wherein said means for selectively including said time-base-correction reference signal in said signal actually recorded on the recording medium also includes said time-base-correction reference signal in said signal actually recorded on the recording medium throughout each of said vertical blanking intervals.

11. Apparatus for recording as set forth in claim 10, wherein said video signal is a composite video signal including a luminance signal component and a chrominance signal component, and wherein said luminance signal component includes therewithin said horizontal and vertical blanking intervals respectively including horizontal and vertical synchronizing signals, said apparatus for recording further comprising:

means for frequency-modulating a carrier with said luminance signal component, thereby generating a frequency-modulation signal occupying a first frequency band, said frequency-modulation signal being a first of said signals descriptive of said video signal as originally supplied for recording and being included in said signal actually recorded on the recording medium at an amplitude level larger than that of said time-base-correction reference signal.

12. Apparatus for recording as set forth in claim 11, further comprising:

means for substituting in said signal as actually recorded on the recording medium, in place of said frequency-modulation signal during said blanking intervals, a frequency-shift-keying signal of similar amplitude, which frequency-shift-keying signal is at frequencies equal to the principal sidebands of said frequency-modulation signal as would describe tip and pedestal levels of synchronizing pulses occurring during said blanking intervals.

13. Apparatus for recording as set forth in claim 12 wherein said means for generating said time-base-correction reference signal generates said time-base-correction reference signal with a frequency above the first and second frequencies of said frequency-shift-keying signal, but within said first frequency band.

14. Apparatus for recording as set forth in claim 13 further comprising:

means for down-converting said chrominance signal component in frequency thereby generating a color-under signal occupying a second frequency band below said first frequency band in frequency, said color-under signal being a second of said signals descriptive of said video signal as originally supplied for recording.

15. Apparatus for recording as set forth in claim 12 wherein said means for generating said time-base-correction reference signal generates said time-base-correction reference signal with a frequency above all frequencies in said video signal as originally supplied for recording, but within said first frequency band.

16. Apparatus for recording as set forth in claim 15 further comprising:

means for down-converting said chrominance signal component in frequency thereby generating a color-under signal occupying a second frequency band below said first frequency band in frequency, said color-under signal being a second of said signals descriptive of said video signal as originally supplied for recording.

17. A video recording device for generating video signals having time-base-correction reference signals for recordation, said device comprising:

means for generating video-modulated carrier signals by modulating a carrier in response to received video signals;

means for separating horizontal synchronization signals from said received video signals;

means for generating time-base-correction reference signals having periods varying in response to period variations of said horizontal synchronization signals;

means, responsive to detecting pedestals of said horizontal synchronization signals, for generating signals descriptive of pedestal level;

means, responsive to detecting said horizontal synchronization signals, for generating signals descriptive of tips of synchronizing pulses in said horizontal synchronization signals; and     means for combining said time-base-correction reference signals into horizontal blanking intervals of said modulated video signals and providing resultant signals to a recording element, which means for combining include:

means for generating combined signals by adding said said time-base-correction reference signals to said signals descriptive of pedestal level and to said signals descriptive of tips of synchronizing pulses;

means for generating gating pulses during horizontal blanking intervals of said received video signals; and     switching means for alternatively providing said modulated video signals during horizontal scanning intervals and said combined signals during said horizontal blanking intervals in response to said gating pulses.

18. A video recording device as set forth in claim 17, wherein said means for generating modulated video signals is of a type that modulates the frequency of said carrier in response to said received video signals thereby to generate frequency-modulation sidebands of said carrier, wherein said means for generating signals descriptive of pedestal level generates its signals at a frequency similar to the principal frequency-modulation sideband of said carrier produced by said means for generating video-modulated carrier signals in response to pedestal level portions of said received video signals, and wherein said means for generating signals descriptive of tips of synchronizing pulses generates its signals at a frequency similar to the principal frequency-modulation sideband of said carrier produced by said means for generating video-modulated carrier signals in response to synchronizing-pulse-tip portions of said received video signals.

19. Apparatus for recovering a video signal used to frequency modulate a carrier wave recorded on a recording medium together with a time-base-correction reference signal of a frequency within the band of frequencies occupied by frequency-modulation sidebands of said carrier wave, all the respective portions of which time-base-correction reference signal occur during and only during blanking intervals of said video signal, said apparatus comprising:

means for reproducing from said recording medium a reproduced signal comprising said frequency modulated carrier wave accompanied by said time-base-correction signal, respective portions of which said time-base-correction signal occur during and only during blanking intervals of said video signal;

means for demodulating said reproduced signal, said means for demodulating being sensitive to said frequency-modulated carrier wave but relatively insensitive to said time-base-correction signal, thereby to generate a demodulated video signal that is essentially free of said time-base-correction signal;

a time-base-correction circuitry for correcting time-base errors of said demodulated video signal in response to a continuously supplied time-base-correction reference signal applied thereto;

means for separating a time-base-correction reference signal from said reproduced signal by selecting portions said reproduced signal that are in the frequency range of said time-base-correction reference signal and that occur during and only during blanking intervals of said demodulated video signal, thereby to generate a separated time-base-correction reference signal having respective segments which occur during and only during blanking intervals of said demodulated video signal; and means, responsive to said segments of said separated time-base-correction reference signal, for generating said continuously supplied time-base-correction reference signal applied to said time-base-correction circuitry.

20. Apparatus as claimed in claim 19, wherein said means for separating a time-base-correction reference signal from said reproduced signal comprises:

a band-pass filter for providing a selective response to portions of said reproduced signal that are in the frequency range of said time-base-correction reference signal;

means for generating gate pulses responsive to detecting blanking intervals in said demodulated video signal; and means responsive to said gate pulses for gating the selective response of said band-pass filter to said means for generating said continuously supplied time-base-correction reference signal, as said segments of said separated time-base-correction reference signal.

21. Apparatus as claimed in claim 20, wherein said means for generating gate pulses responsive to detecting blanking intervals in said demodulated video signal comprises:

means for separating synchronizing signals from said reproduced signal to provide separated synchronizing signals; and means responsive to said separated synchronizing signals for generating said gate pulses.

22. Apparatus as claimed in claim 21, wherein said means for separating synchronizing signals from said reproduced signal is of a type that provides separated horizontal synchronizing signals.

23. Apparatus as claimed in claim 22, wherein said means for separating synchronizing signals from said reproduced signal is of a type that also provides separated vertical synchronizing signals.

24. Apparatus as claimed in claim 20, wherein said means for generating said continuously supplied time-base-correction reference signal includes a burst injection locked first oscillator for generating continuous oscillations of a frequency controlled by said segments of said separated time-base-correction reference signal applied thereto as burst injection locking signal.

25. Apparatus as claimed in claim 24, wherein said time-base-correction circuitry comprises:

time-base-correction memory circuitry for delaying said demodulated video signal in amount controlled by the difference in read and write addresses applied to said memory circuitry;

a second oscillator for generating respective continuous oscillations, as automatically frequency and phase controlled responsive to the continuous oscillations of said burst injection locking oscillator;

a write address counter for cyclically counting the continuous oscillations of said first oscillator, thereby to generate write addresses for said time-base-correction memory circuitry; and a read address counter for cyclically counting the continuous oscillations of said second oscillator, thereby to generate read addresses for said time-base-correction memory circuitry.

26. A video reproducing device for regenerating video signals from a record medium, said device comprising:

means for separating modulated video signals from video information regenerated from said record medium;

means for generating demodulated video signals by demodulating said modulated video signals;

time-base-correction control means for generating control signals in response to gating pulses and in response to time-base-correction reference signals contained in said modulated video signals;

video signal time-base-correction means for generating time-base-corrected video signals by time-base-correcting said demodulated video signals in response to said control signals;

means for separating horizontal synchronization signals from said time-base-corrected video signals; and means for generating said gating pulses during blanking intervals of said demodulated video signals responsive to the separated horizontal synchronization signals.

27. A video reproducing device as claimed in claim 26, wherein said time-base-correction control means comprises a burst injection locked oscillator circuit receiving said time-base-correction reference signals only when said gating pulses are generated and regulating a frequency of said control signals in response to said time-base-corrected reference signals.

28. A video reproducing device as claimed in claim 26, wherein a frequency of said control signals is regulated in response to said time-base-corrected reference signals.

29. A video reproducing device as claimed in claim 26, wherein said time-base-correction reference signals are contained only in blanking intervals of said modulated video signals.

30. A video reproducing device for regenerating video signals from a record medium, said device comprising:

luminance/chrominance separating means for separating modulated luminance signals and modulated chrominance signals from video information regenerated from said record medium;

means for generating demodulated luminance signals by demodulating said modulated luminance signals;

means for generating demodulated chrominance signals by demodulating said modulated chrominance signals;

burst injection locked oscillator means for receiving time-base-correction reference signals contained in said demodulated luminance signals in response to gating pulses and regulating a frequency of output signals therefrom in response to the received time-base-correction reference signals;

luminance time-base-correction means for generating time-base-corrected luminance signals by time-base-correcting said demodulated luminance signals in response to said output signals;

chrominance time-base-correction means for generating time-base-corrected chrominance signals by time-base-correcting said demodulated chrominance signals in response to said output signals;

means for separating horizontal synchronization signals;

means for generating said gating pulses during blanking intervals, the positions in time of which blanking intervals are calculated in response to said separated horizontal synchronization signals; and means for generating composite video signals by combining said time-base-corrected luminance signals and said time-base-corrected chrominance signals.

31. A video reproducing device as claimed in claim 30, further comprised of said burst injection locked oscillator means receiving said time-base-correction reference signals only in blanking intervals of said modulated luminance signals.

32. A video reproducing device as claimed in claim 30, wherein said horizontal synchronization signals are separated from said time-base-corrected luminance signals.

33. Apparatus for recovering a luminance signal used to frequency modulate a carrier wave recorded on a recording medium together with a color-under signal and a time-base-correction reference signal, all the respective portions of said time-base-correction reference signal occurring only during blanking intervals in said luminance and color-under signals, said time-base-correction reference signal being of a frequency within a first band of frequencies occupied by frequency-modulation sidebands of said carrier wave, said color-under signal being within a second band of frequencies below said first band of frequencies, said apparatus comprising:

means for reproducing from said recording medium a reproduced signal comprising said frequency modulated carrier wave accompanied by said color-under signal and time-base-correction signal, respective portions of which said time-base-correction signal occur during and only during blanking intervals in said luminance and color-under signals;

first frequency-selective filtering means responding to said reproduced signal for separating therefrom said frequency modulated carrier wave accompanied by said time-base-correction signal, as a first frequency-selective filter response;

second frequency-selective filtering means responding to said reproduced signal for separating therefrom said color-under signal, as a second frequency-selective filter response;

means for demodulating frequency variations in said first frequency-selective filter response, said means for demodulating being sensitive to said frequency-modulated carrier wave but relatively insensitive to said time-base-correction signal, thereby to generate a demodulated luminance signal that is essentially free of said time-base-correction signal;

first time-base-correction circuitry, responsive to a continuously supplied time-base-correction reference signal applied thereto, for correcting time-base errors of said demodulated luminance signal to generate a time-base-corrected luminance signal;

second time-base-correction circuitry, responsive to said continuously supplied time-base-correction reference signal applied thereto, being correcting time-base errors of color-under signal from said second frequency-selective filter response, thereby to generate a time-base-corrected color-under signal;

means for separating a time-base-correction reference signal from said reproduced signal by selecting portions said reproduced signal that are in the frequency range of said time-base-correction reference signal and that occur during and only during blanking intervals of said demodulated luminance, thereby to generate a separated time-base-correction reference signal having respective segments which occur during and only during blanking intervals of said demodulated luminance signal; and means, responsive to said segments of said separated time-base-correction reference signal, for generating said continuously supplied time-base-correction reference signal applied to said time-base-correction circuitry.

34. Apparatus as claimed in claim 33, wherein said means for separating a time-base-correction reference signal from said reproduced signal comprises:

a band-pass filter for providing a selective response to portions of said reproduced signal that are in the frequency range of said time-base-correction reference signal;

means for generating gate pulses responsive to detecting blanking intervals in said demodulated luminance signal; and means responsive to said gate pulses for gating the selective response of said band-pass filter to said means for generating said continuously supplied time-base-correction reference signal, as said segments of said separated time-base-correction reference signal.

35. Apparatus as claimed in claim 34, wherein said means for generating gate pulses responsive to detecting blanking intervals in said demodulated video signal comprises:

means for separating synchronizing signals from said demodulated luminance signal to provide separated synchronizing signals; and means responsive to said separated synchronizing signals for generating said gate pulses.

36. Apparatus as claimed in claim 35, wherein said means for separating synchronizing signals from said reproduced signal is of a type that provides separated horizontal synchronizing signals.

37. Apparatus as claimed in claim 36, wherein said means for separating synchronizing signals from said reproduced signal is of a type that also provides separated vertical synchronizing signals.

38. Apparatus as claimed in claim 34, wherein said means for generating said continuously supplied time-base-correction reference signal includes a burst injection locked first oscillator for generating continuous oscillations of a frequency controlled by said segments of said separated time-base-correction reference signal applied thereto as burst injection locking signal.

39. Apparatus as claimed in claim 38, including:
   a second oscillator for generating respective continuous oscillations, as automatically frequency and phase controlled responsive to the continuous oscillations of said burst injection locking oscillator;
   a write address counter for cyclically counting the continuous oscillations of said first oscillator, thereby to generate write addresses;
   a read address counter for cyclically counting the continuous oscillations of said second oscillator, thereby to generate read addresses;
   first time-base-correction memory circuitry included in said first time-base-correction circuitry, supplied said read addresses from said read address counter, supplied said write addresses from said write address counter, and connected for delaying said demodulated luminance signal in amount controlled by the difference in said read addresses and said write addresses applied to said first time-base-correction memory circuitry; and
   second time-base-correction memory circuitry included in said second time-base-correction circuitry, supplied said read addresses from said read address counter, supplied said write addresses from said write address counter, and connected for delaying said color-under signal from said second frequency-selective filter response in amount controlled by the difference in read and write addresses applied to said second time-base-correction memory circuitry.

40. Apparatus as claimed in claim 33, including:
   means up-converting the frequency of said time-base-corrected color-under signal for generating a time-base-corrected chrominance signal; and
   means combining said time-base-corrected luminance signal and said time-base-corrected chrominance signal for generating a time-base-corrected composite video signal.

41. A time-base-correction apparatus for a video recording and reproducing system, said time-base-correction apparatus comprising:
   luminance and chrominance signal separation means for separating and outputting a luminance signal and a chrominance signal from a received composite video signal;
   luminance signal modulator means for frequency modulating a luminance carrier with said luminance signal for generating a frequency modulated luminance signal in a first frequency band;
   chrominance signal modulation means for down converting said chrominance signal for generating a color-under signal in a second frequency band, said second frequency band being greater than 0 Mhz and lower than said first frequency band;
   horizontal and vertical sync signal separation means for separating a horizontal sync signal from said luminance signal and for separating a vertical sync signal from said luminance signal;
   sync level modulated signal generating means for receiving said horizontal and vertical sync signals for generating a sync level modulated signal;
   pedestal level modulated signal generating means for receiving said horizontal and vertical sync signals for generating a pedestal level modulated signal, said pedestal level modulated signal having an amplitude equal to an amplitude of said sync level modulated signal;
   first time-division multiplexing means for selectively outputting, as a frequency shift keyed signal, said sync level modulated signal during sync pulses of said separated horizontal and vertical sync signals and said pedestal level modulated signal during intervals between said sync pulses of said separated horizontal and vertical sync signals;
   time-base-correction signal generating means for generating clock pulses in response to the separated horizontal sync signals, said clock pulses having a period determined by the interval between the pulses of said horizontal sync signal;
   waveform shaping means for converting said clock pulses to sinusoidal form for generating a sinusoidal time-base-correction signal in a narrow third frequency band, said narrow third frequency band being within said first frequency band;
   mixing means for additively mixing said frequency shift keyed signal and said sinusoidal time-base-correction signal;
   gate pulse generating means for generating first gate pulses having a width greater than a horizontal blanking interval in response to said horizontal sync signals and for generating second gate pulses having a width greater than a vertical blanking interval in response to said vertical sync signals;
   second time-division multiplexing means for receiving and selectively outputting the mixed frequency shift keyed signal and sinusoidal time-base-correction signal, output from said mixing means, in response to said first and second gate pulses, and for receiving and selectively outputting said frequency modulated luminance signal during intervals between said first and second gate pulses;
   luminance/chrominance signal mixer means for generating a frequency-division multiplexed signal by additively mixing said color-under signal generated by said chrominance signal modulation means and one of said mixed frequency shift keyed signal and sinusoidal time-base-correction signal and said frequency modulated luminance signal output from said second time-division multiplexing means;
   means for recording said frequency-division multiplexed signal; and
   reproducing means playing back the recorded frequency-division multiplexed signal, for reproducing a time-base-correction reference signal and for generating a time-base-corrected video signal in response to said reproduced time-base-correction reference signal.

42. The apparatus as set forth in claim 41, said color-under signal in said second frequency band comprising:
   amplitude modulated sidebands of a suppressed 629 KHz color-under carrier during horizontal trace intervals; and
   bursts of the suppressed 629 KHz color-under carrier during horizontal retrace intervals.

43. The apparatus as set forth in claim 41, said sync level modulated signal being a first unmodulated carrier signal at a frequency of 3.4 MHz.

44. The apparatus as set forth in claim 43, said pedestal level modulated signal being a second unmodulated carrier signal at a frequency of 3.68 MHz.

45. The apparatus as set forth in claim 44, said third frequency band being centered at a frequency around 5 MHz.

46. The apparatus as set forth in claim 45, said first frequency band having a range between 1.2 and 7 MHz, and said second frequency band having a range between 0 and 1.2 MHz.

47. The apparatus as set forth in claim 41, said reproducing means comprising:

> means for receiving said played back frequency-division multiplexed signal for separating said first frequency band and said second frequency band for outputting said frequency modulated luminance signal in combination with said mixed frequency shift keyed signal and sinusoidal time-base-correction signal and said color-under signal;
>
> bandpass filter means for receiving said first frequency band, and for separating said third frequency band from said first frequency band for outputting said sinusoidal time-base-correction signal;
>
> means responsive to said sinusoidal time-base-correction signal output from said bandpass filter means for generating address signals;
>
> luminance signal demodulation means for receiving said first frequency band and for frequency demodulating said frequency modulated luminance signal for outputting a demodulated luminance signal component comprising sync information;
>
> first time-base-correction means for receiving said demodulated luminance signal and correcting time-base error in said demodulated luminance signal for generating a corrected luminance signal in response to said address signals;
>
> second time-base-correction means for receiving said color-under signal output from said means for receiving said played back frequency-division multiplexed signal, and for outputting a time-base-corrected color-under signal in response to said address signals;
>
> chrominance signal demodulation means for up-converting said time-base-corrected color-under signal to regenerate a separated chrominance signal; and
>
> composite video signal generating means for receiving said corrected luminance signal and said separated chrominance signal for generating a reproduced composite video signal.

48. The apparatus as set forth in claim 47, said reproducing means further comprising:

> a synchronizing signal separator for receiving said corrected luminance signal, and for separating horizontal and vertical synchronizing signals from said corrected luminance signal; and
>
> means responsive to said horizontal and vertical synchronizing signals separated from said corrected luminance signal for generating third and fourth gate pulses for controlling said means responsive to said sinusoidal time-base-correction signal output from said bandpass filter means, said third gate pulses being generated during each horizontal blanking interval and said fourth gate pulses being generated throughout each vertical blanking interval of said corrected luminance signal.

49. The apparatus as set forth in claim 48, said first time-base-correction means comprising a first random access memory, and said second time-base-correction means comprising a second random access memory.

50. The apparatus as set forth in claim 48, said means responsive to said sinusoidal time-base-correction signal output from said bandpass filter means comprising:

> a burst injection locking circuit for receiving said sinusoidal time-base-correction signal output from said bandpass filter means for generating an injection locking signal in response to said third and fourth gate pulses, and for generating a first oscillation signal for generating oscillation signal pulses in response to said injection locking signal;
>
> write address counter means for counting said oscillation signal pulses for generating write addresses, said write addresses being applied to said first and second time-base-correction means;
>
> voltage controlled oscillator means responsive to one of said first oscillation signal and said oscillation signal pulses generated by said burst injection locking circuit for generating a second oscillation signal; and
>
> read address signal generator means for generating read addresses in response to said second oscillation signal, said read address being applied to said first and second time-base-correction means.

51. The apparatus as set forth in claim 49, said means responsive to said sinusoidal time-base-correction signal output front said bandpass filter means comprising:

> a burst injection locking circuit for receiving said sinusoidal time-base-correction signal output from said bandpass filter means for generating an injection locking signal in response to said third and fourth gate pulses, and for generating a first oscillation signal for generating oscillation signal pulses in response to said injection locking signal;
>
> write address counter means for counting said oscillation signal pulses for generating write addresses, said write addresses being applied to write address terminals of said first and second random access memories;
>
> voltage controlled oscillator means responsive to one of said first oscillation signal and said oscillation signal pulses generated by said burst injection locking circuit for generating a second oscillation signal; and read address signal generator means for generating read addresses in response to said second oscillation signal, said read address being applied to read address terminals of said first and second random access memories.

52. The apparatus as set forth in claim 51, said voltage controlled oscillator means comprising an automatic frequency and phase controlled oscillator.

* * * * *

UNITED STATES PATENT AND TRADEMARK OFFICE
CERTIFICATE OF CORRECTION

PATENT NO. : 5,526,129
DATED : 11 June 1996
INVENTOR(S) : Jeong-Wan Ko

It is certified that error appears in the above-indentified patent and that said Letters Patent is hereby corrected as shown below:

```
On the title page: Item [75]Inventor
``` change " Jeone-Wan Ko" to --Jeong-Wan Ko--:

Signed and Sealed this

Nineteenth Day of August, 1997

*Attest:*

BRUCE LEHMAN

*Attesting Officer*      *Commissioner of Patents and Trademarks*